United States Patent
Page et al.

(10) Patent No.: US 9,236,624 B2
(45) Date of Patent: Jan. 12, 2016

(54) USE OF AMMONIA AS SOURCE OF HYDROGEN FUEL AND AS A GETTER FOR AIR-CO2 IN ALKALINE MEMBRANE FUEL CELLS

(71) Applicant: CellEra, Inc., Caesarea (IL)

(72) Inventors: Miles Page, Hod Hasharon (IL); Dario Dekel, Zichron Yaakov (IL); Ziv Gottesfeld, Gan Yoshiya (IL); Shimshon Gottesfeld, Niskayuna, NY (US)

(73) Assignee: Elbit Systems Land and C4I Ltd., Natanya (IL)

( * ) Notice: Subject to any disclaimer, the term of this patent is extended or adjusted under 35 U.S.C. 154(b) by 0 days.

(21) Appl. No.: 14/196,165

(22) Filed: Mar. 4, 2014

(65) Prior Publication Data

US 2014/0186728 A1    Jul. 3, 2014

Related U.S. Application Data

(63) Continuation of application No. 13/529,188, filed on Jun. 21, 2012, now abandoned.

(60) Provisional application No. 61/500,879, filed on Jun. 24, 2011.

(51) Int. Cl.
| | |
|---|---|
| H01M 8/22 | (2006.01) |
| H01M 8/06 | (2006.01) |
| H01M 8/02 | (2006.01) |
| H01M 8/10 | (2006.01) |

(52) U.S. Cl.
CPC .......... *H01M 8/0606* (2013.01); *H01M 8/0263* (2013.01); *H01M 8/0668* (2013.01); *H01M 8/222* (2013.01); *H01M 8/06* (2013.01); *H01M 2008/1095* (2013.01); *Y02E 60/364* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 4,923,768 | A | 5/1990 | Kaneko et al. |
| 5,133,842 | A | 7/1992 | Taylor et al. |
| 6,936,363 | B2 | 8/2005 | Kordesch et al. |
| 2003/0219643 | A1 | 11/2003 | Yang et al. |

(Continued)

FOREIGN PATENT DOCUMENTS

| | | |
|---|---|---|
| JP | 2010282755 | 12/2010 |
| JP | 2011034710 | * 2/2011 |

(Continued)

OTHER PUBLICATIONS

Resnik et al., "Aqua ammonia process for simultaneous removal of CO2, SO2, and NOx," 2004, Int. J. Environmental Technology and Management, vol. 4, pp. 89-104.

(Continued)

*Primary Examiner* — Ula C. Ruddock
*Assistant Examiner* — Matthew Van Oudenaren
(74) *Attorney, Agent, or Firm* — ISUS Intellectual Property PLL

(57) ABSTRACT

Embodiments of the invention provide an ammonia operated fuel cell system including an alkaline membrane fuel cell (AMFC) having an anode, and an ammonia thermal cracker including a combustion chamber, the cracker being in gas communication with an ammonia source, and configured to provide a supply of $H_2$ directly to the AMFC anode.

9 Claims, 4 Drawing Sheets

(56) References Cited

U.S. PATENT DOCUMENTS

| | | |
|---|---|---|
| 2003/0232224 A1 | 12/2003 | Kordesch et al. |
| 2004/0154223 A1 | 8/2004 | Powell et al. |
| 2004/0163313 A1 | 8/2004 | Buxbaum |
| 2005/0118485 A1 | 6/2005 | Tawfik et al. |
| 2010/0021777 A1 | 1/2010 | Gottesfeld et al. |
| 2011/0151342 A1 | 6/2011 | Gottesfeld et al. |
| 2011/0195323 A1 | 8/2011 | Inoue et al. |

FOREIGN PATENT DOCUMENTS

| | | |
|---|---|---|
| WO | 0208117 | 1/2002 |
| WO | 2007078292 | 7/2007 |
| WO | 2010041642 | 4/2010 |

OTHER PUBLICATIONS

International Search Report, Corresponding PCT Application No. PCT/US2012/043519, dated Nov. 23, 2012, 4 pages.

European Search Report, Corresponding EP Application No. 12802234, dated Feb. 27, 2015, 5 pages.

* cited by examiner

USE OF AMMONIA AS SOURCE OF HYDROGEN FUEL AND AS A GETTER FOR AIR-CO2 IN ALKALINE MEMBRANE FUEL CELLS

RELATED APPLICATIONS

This application is a continuation application of U.S. application Ser. No. 13/529,188 filed Jun. 21, 2012, which claims priority to U.S. Provisional Application No. 61/500,879, filed Jun. 24, 2011, the entire contents of each are hereby expressly incorporated by reference in their entirety.

FIELD OF INVENTION

This invention relates to the field of Alkaline Membrane Fuel Cells (AMFCs) and in particular to utilizing ammonia as a source to generate electricity.

BACKGROUND

Alkaline membrane fuel cells (AMFCs) generate electricity using mostly Hydrogen fuel. In the past, the Hydrogen source considered for AMFC fuel cell stacks has been a tank of compressed Hydrogen gas connected to the AMFC. Compressed Hydrogen, however, is not easily available in many parts of the world, and handling of compressed $H_2$ gas tanks can be demanding because of transport regulations and because of the low weight % Hydrogen in such gas tanks. Ammonia tanks, on the other hand, contain liquid ammonia under pressure of several bars and consequently have significantly higher weight % of Hydrogen versus compressed $H_2$ gas. Use of ammonia as source of Hydrogen can therefore provide an improvement in Hydrogen fuel packaging and facilitates fuel supply in many rural areas where ammonia is much more readily available than compressed Hydrogen.

SUMMARY

In general, in an aspect, embodiments of the invention can provide an ammonia operated fuel cell system including an alkaline membrane fuel cell (AMFC) having an anode, and an ammonia thermal cracker including a combustion chamber, the cracker being in gas communication with an ammonia source, and configured to provide a supply of $H_2$ directly to the AMFC anode.

Implementations of the invention can include one or more of the following features. Exhaust from the anode of the AMFC is fed into the combustion chamber of the cracker. The cracker is configured to produce an output of substantially 75% Hydrogen and 25% Nitrogen. The ammonia operated fuel cell further includes a flow channel configured to provide a substantially uniform concentration of $H_2$ to substantially all parts of an active area of the AMFC. The flow channel includes a spiral in a first rotational sense between an inlet and a center and a spiral in a second rotational sense between the center and the outlet. A cathode of the AMFC is in gas communication with the ammonia source. An air supply to the cathode of the AMFC is configured to receive a bleed of ammonia from the ammonia source. An air supply to a cathode of the AMFC is configured to getter $CO_2$ from the air supply. An exhaust from a cathode of the AMFC is fed into the combustion chamber of the ammonia cracker.

Various aspects of the invention may provide one or more of the following capabilities. Hydrogen can be provided to an AMFC using bottled ammonia. An ammonia cracker can be configured to provide Hydrogen to an AMFC using the bottled ammonia. To prevent carbonation of the AMFC ionomer by $CO_2$ entering the AMFC with the air stream, gettering of the $CO_2$ by ammonia can be accomplished. AMFCs can be operated in area where there is a short supply of neat Hydrogen. Up to a 5× extension of operation time per tank fill-up can be accomplished due to the higher density of liquefied ammonia versus that of compressed hydrogen, in a 200 bar cylinder.

These and other capabilities of the invention, along with the invention itself, will be more fully understood after a review of the following figures, detailed description, and claims.

DETAILED DESCRIPTION

Embodiments of the invention provide techniques for providing $H_2$ to an AMFC using an ammonia cracker. Preferably, the ammonia is provided to the AMFC system from bottles of liquid ammonia contained under low pressure. Ammonia flows from the bottle to the thermal cracker, which is configured to produce $H_2$ that is provided to the AMFC. The Hydrogen/Nitrogen mixture generated by the cracker can be distributed along the active area of the AMFC using a flow channel that is optimized (e.g., using a series of counter-oriented spirals) to provide a substantially uniform distribution of $H_2$ to the electrode active area. The AMFC system can also be configured such that exhaust from an anode and/or cathode of the AMFC is directed to a combustion chamber of the ammonia cracker. The AMFC system can be further configured such that ammonia is bled into an air feed stream of the AMFC to preferably reduce carbonation of the $OH^-$ conducting ionomer by $CO_2$ gettering. Other embodiments are within the scope of the invention.

Figure 1:
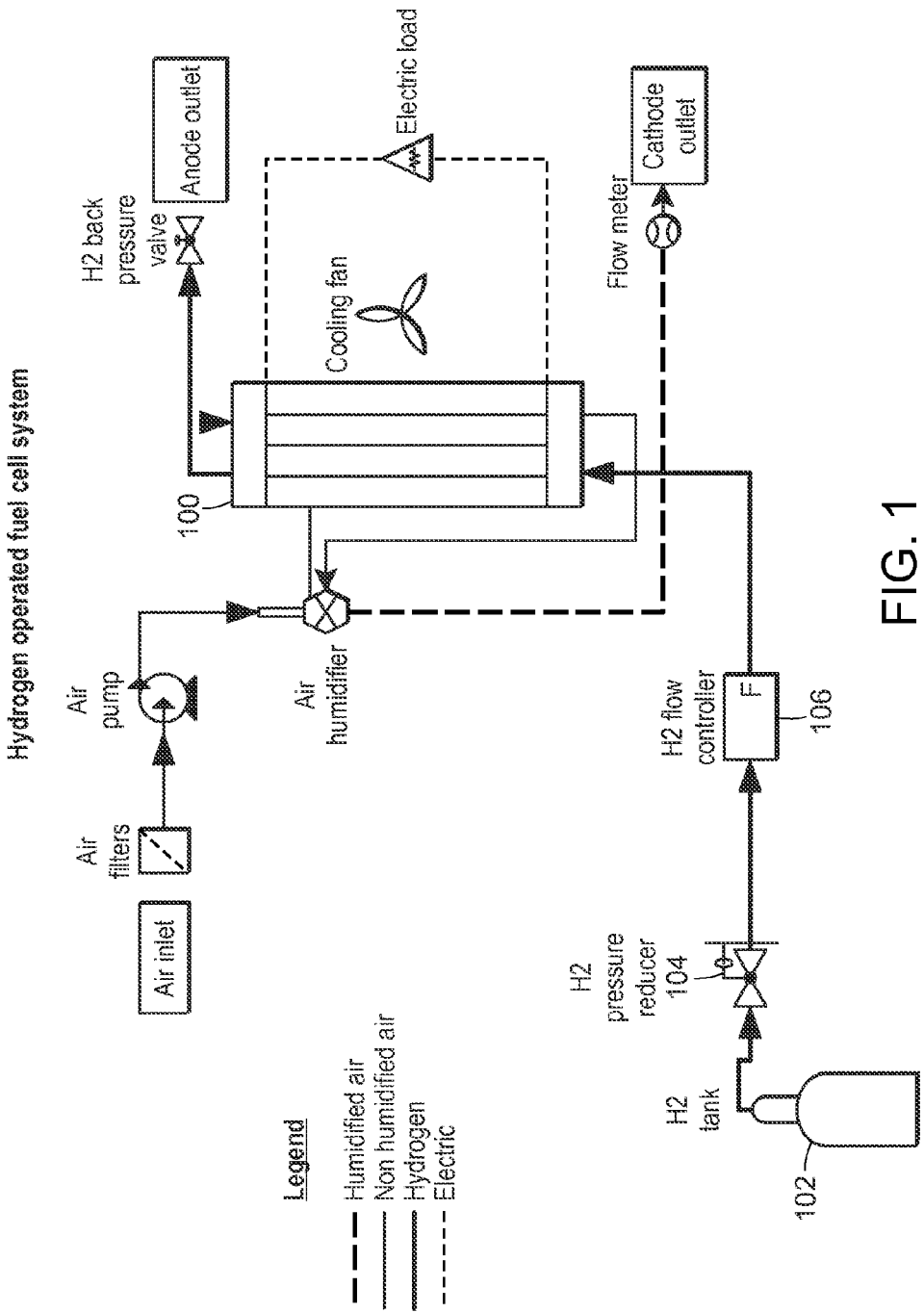
FIG. 1 shows a schematic diagram of an AMFC system with a direct supply of $H_2$.

FIG. 1 shows an example of an AMFC stack 100 with a compressed hydrogen tank 102 as the fuel source. This is a simple AMFC system design due at least in part to the direct feed into the stack 100 of the stored fuel 102 through a hydrogen pressure reducer 104 and a hydrogen flow controller.

Figure 2:
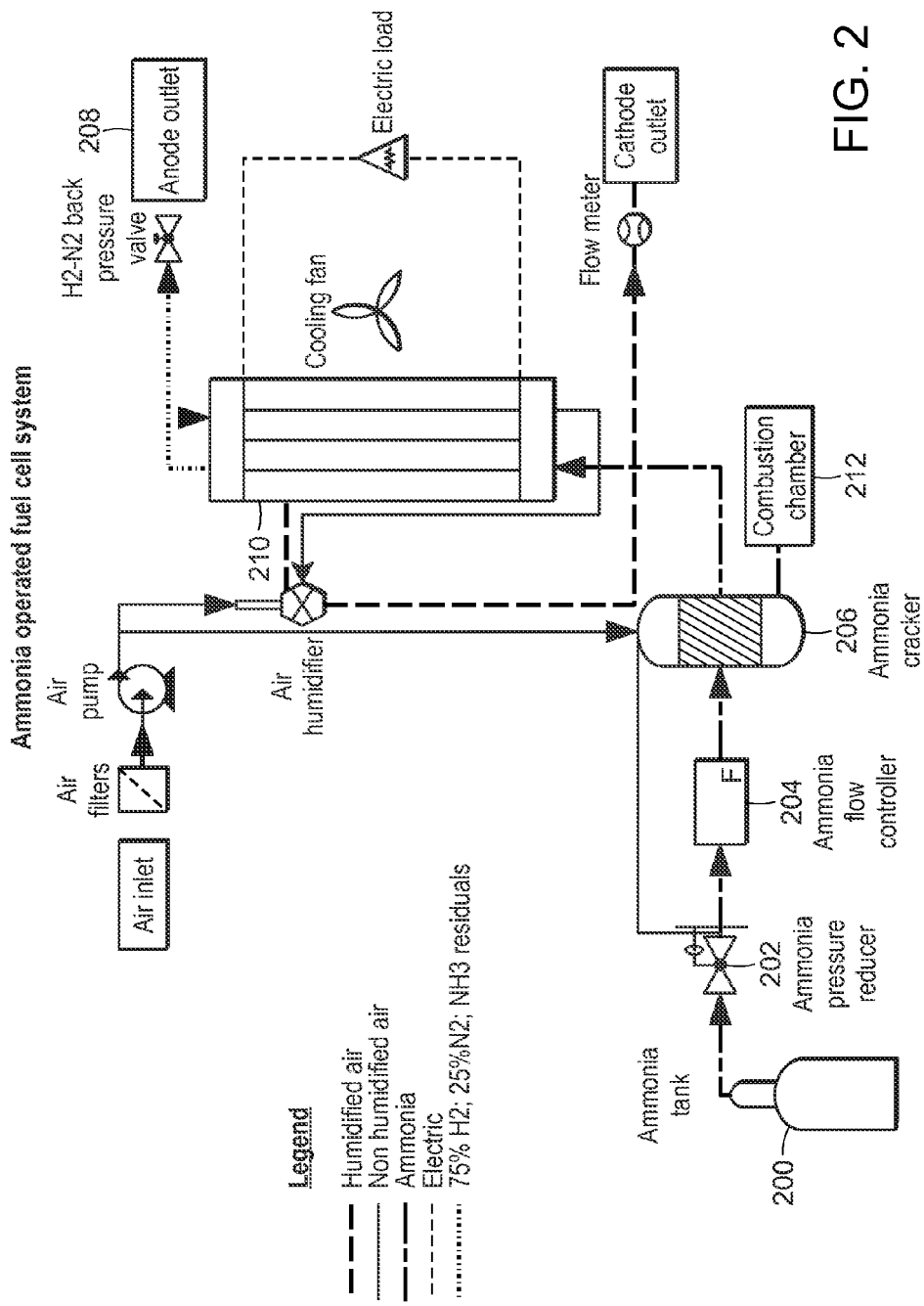
FIG. 2 shows a schematic diagram of an AMFC system with a supply of $H_2$-rich gas mixture from an ammonia cracker.

FIG. 2 illustrates an AMFC fed by an ammonia storage tank 200. The ammonia storage tank can feed ammonia gas through an ammonia pressure reducer 202 and an ammonia flow controller to a thermal cracker 206 which generates a 75% Hydrogen/25% Nitrogen gas mixture to be used as the fuel feed stream for the stack 210. While FIG. 2 shows release of the anode exhaust 208 to the outside atmosphere as an option, the anode exhaust 208 in such system can also be fed into the fuel inlet of the combustor component 212 of the cracker. The combustor component 212 then uses the anode exhaust gas as fuel for the combustor. With the major feed to the combustor 212 being the tank-stored ammonia fuel, the combustor 212 can maintain the temperature required for the catalytic decomposition of ammonia into its component elements, according to:

$$2NH_3 + heat = N_2 + 3H_2 \qquad (1)$$

The use of ammonia instead of Hydrogen to fuel the AMFC system can be beneficial because, for example, ammonia is typically much more accessible over large areas of the world when compared with compressed Hydrogen, particularly so in rural areas, and because a tank of a given volume filled by ammonia contains 5× the energy versus that same tank filled by compressed hydrogen at 200 bars. One important characteristic of ammonia, which explains the reluctance to use it as hydrogen carrier for mainstream fuel cells utilizing proton conducting membranes (PEMFCs), is the ultra-high sensitivity of a PEMFC to even minute traces of ammonia, that can react aggressively by a base/acid type process to convert protons in the acidic ionomer to ammonium ions, according to:

$$NH_3 + H^+ = NH_4^+ \qquad (2)$$

The conversion of protons to ammonium ions according to Equation (2) can deactivate a PEMFC. Since the conversion occurs at even sub-ppm levels of ammonia in the fuel feed, cracking ammonia according to Equation (1) to generate a fuel feed for a PEMFC can be done only at the expense of the inclusion in the feed stream of a highly effective ammonia filtering system which will guarantee 100% removal of the smallest traces of ammonia resulting from imperfect conversion of ammonia in the cracker to Hydrogen by the process identified in Equation (1). In contrast, the ionic functionality in the alkaline membrane used in the AMFC is itself a base, OH—, and consequently no reaction of $NH_3$ residues from the cracker occurs with the ionomer in the AMFC.

This is not to say, however, that other elements of the AMFC cell and hardware are guaranteed immunity in the presence of ammonia residues in the fuel feed stream. However, surprisingly, initial testing performed on a system constructed in accordance with FIG. 2, showed that, up to significant cell current levels, the performance of the AMFC operating on cracked ammonia was substantially identical to the performance of the same AMFC operating using neat hydrogen gas. Such initial testing suggests that, at the ammonia levels of 1 ppm to 20,000 ppm (the level that was present in the fuel feed stream during our test), there is no significant performance loss incurred by the ammonia entering the AMFC anode. This demonstrates that, in turn, no catalyst deactivation or other material instability is caused by the entry into the AMFC anode of ammonia at a level 100× higher than that required to completely deactivate a PEMFC.

It is believed that this is a first report of a reduction to practice of the system shown in FIG. 2, consisting of an AMFC stack fed by thermally cracked ammonia, while confirming the viability of operation with no filtration of ammonia residues upstream of the stack fuel inlet by demonstrating performance comparable to that obtained with a neat Hydrogen feed in operation on non-filtered, thermally cracked ammonia with ammonia levels of the order of 1 ppm to 20,000 ppm in the non-filtered anode feed stream.

Kordesch et al described in U.S. Pat. No. 6,936,363, use of an ammonia thermal cracker as source of hydrogen for an Alkaline Fuel Cell (AFC) which uses an aqueous solution of KOH as electrolyte. An important relevant difference between the AMFC (membrane electrolyte fuel cell) and an AFC (liquid electrolyte fuel cell)), is that the total volume of water per unit area of the electrode is several orders of magnitude smaller in the case of the AMFC. Consequently, the concentration of ammonia in contact with the electrode surface in the AMFC is much higher at some given level of ammonia residue in the hydrogen feed stream. The teaching provided here of a combination of an ammonia cracker with an AMFC, therefore addresses a significantly taller challenge of immunity of both the membrane material and the catalysts, to high local concentrations of ammonia, particularly when the ammonia levels allowed in the cracker exhaust are high, as preferred for smaller cracker size, lower cracker cost and lower energy demand.

Potential problems arise when switching from 100% hydrogen feed of a system like that of FIG. 1 to 75% hydrogen mixed with 25% inert gas (e.g., Nitrogen) like that of FIG. 2 one issue is how to operate at high fuel utilization without loss of performance having to do with the drop of Hydrogen concentration near the fuel outlet well below the inlet level of 75%. This is fully expected as Hydrogen is consumed along the flow channel while the inert component of the anode gas mixture remains intact. Such continuous dilution of the reactant Hydrogen gas is typically a smaller problem in a PEMFC, because the anode process in the PEMFC does not face the extra challenge of excess water buildup incurred in the AMFC anode. In the AMFC, the anode is the water generating electrode. Consequently, some given degree of hydrogen dilution by inert gas will have a stronger mass transport consequences in the water rich AMFC anode.

An innovative approach to meet this important challenge of operating an AMFC with diluted Hydrogen gas at high performance under high fuel utilization conditions has been discovered, relying on a simple, one-pass mode for the fuel feed.

Figure 3:
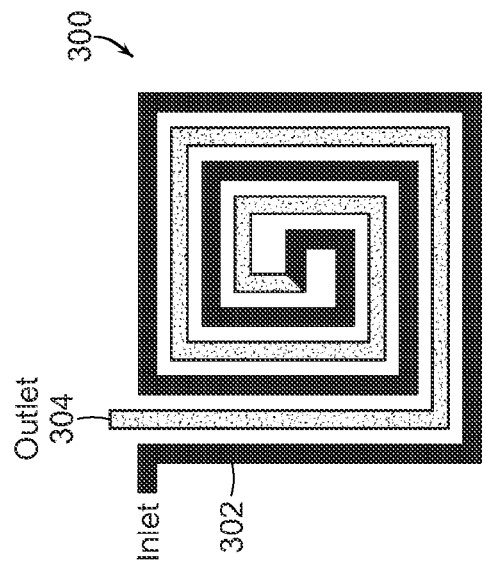
FIG. 3 shows a schematic diagram of a flow channel.

FIG. 3 shows an exemplary unique type flow field which preferably provides a uniform Hydrogen concentration across the active area of an AMFC cell, in spite of the large drop in hydrogen concentration between inlet and outlet ports under high fuel utilization conditions. The unique flow field 300 shown in FIG. 3 includes a spiral in a first direction 302 (e.g., a counter clockwise-spiral direction) between an inlet and the center followed by a second spiral in a second direction 304 (e.g., clockwise spiral direction) between the center and an outlet, with the inlet and outlet ports preferably positioned at close proximity. The result of such flow field design is that each element of the active area is preferably fed by a pair of channels of Hydrogen concentrations which, on average, are the same. For example, each portion of the active area will preferably have next to it a Hydrogen-rich and a Hydrogen-poor channel that offset each other to feed the active area with a mixture that is preferably 50% Hydrogen and 50% inactive gas. As a further example, near the inlet, the two adjacent channels will preferably contain 75% and 25% Hydrogen, respectively. Thus, the active area near the inlet is preferably fed by a 50% Hydrogen and 50% inactive gas mixture. At another area, the breakdown could be 60% and 40% Hydrogen, which again averages to 50% Hydrogen to that area. The exact values can depend on the actual degree of fuel utilization. Preferably, the configuration shown in FIG. 3 ensures a Hydrogen concentration having a good uniformity (e.g., 50%) across the active area. This is in contrast to a system that has a sharp drop from 75% to 25% Hydrogen concentration between the inlet and outlet when an ordinary flow field is used (i.e., a flow field without a "turning around at the center.").

Next is described an innovative approach to the use of ammonia as "CO2 getter" in a system of the type described in FIG. 2. Once ammonia is stored next to an AMFC fuel cell stack as the source of the hydrogen fuel, was determined that the ammonia can provide an additional function of special importance for the AMFC $CO_2$ immunity.

A previous Patent Application (i.e., Ser. No. 12/862,746, filed Aug. 24, 2010, entitled "Systems and Methods of Security Immunity to Air CO2 in Alkaline Fuel Cells", the text of which is incorporated by reference herein in its entirety) and assigned to the assignee of the present application, describes a comprehensive technique to prevent AMFC losses incurred by entry of air-$CO_2$ into the AMFC cathode. The technique described in that patent application is based on $CO_2$ sequestration sub-units placed upstream the cell and an in-situ, electrochemical decarbonation taking place at the cell anode. While ammine or hydroxide active materials were used for sequestration of $CO_2$ in our previous Patent Application, here ammonia preferably undergoes base-acid reaction with $CO_2$ to form ammonium carbonate:

$$NH_3 + H_2O + CO_2 = (NH_4^+)(HCO_3^-) \quad (3)$$

and/or $$2NH_3 + H_2O + CO_2 = (NH_4^+)_2(CO_3^=) \quad (4)$$

Capturing $CO_2$ by ammonia in this way, can prevent carbonation of the functional groups in the polymer by air $CO_2$, according to:

$$—(NR_4^+)(OH^-) + CO_2 = —(NR_4^+)(HCO_3^-) \quad (5)$$

where —$(NR_4^+)(OH^-)$ is preferably a tetra-alkyl ammonium hydroxide functional group of the AMFC ionomer and —$(NR_4^+)(HCO_3^-)$ is the carbonated (i.e., deactivated) form of such functional group. The process of Equation (5) is known to degrade the AMFC performance significantly. Thus, when ammonia is available next right to the stack, it could be used for $CO_2$ sequestration according to Equations (3) and (4), thereby relieving the cell of air $CO_2$ related performance losses while avoiding the need of an additional unit and active material for that purpose. Once the CO2 neutralization function of the ammonia available next to a stack, according to Equations (3) and (4), is considered, a remaining important question is how to achieve high efficiency of this process, as reflected by the probability of the reactions of Equations (3) and (4) much exceeding the probability of ionomer carbonation by CO2 entering through the air cathode, according to (5).

Ammonia can be naturally fed into the cell with the Hydrogen/Nitrogen fuel mix (e.g., it is fed into the cell anode and its level in the feed stream can be elevated to, for example, 0.1% in the anode feed), to achieve $CO_2$ sequestration. However, this mode of ammonia supply to the cell is not likely to fulfill the requirement of the probability of processes (3) or (4) occurring being much higher than the probability of process (5) occurring. The reason is that any $CO_2$ molecule that enters first into the cell cathode of an operating AMFC, encounters there a current-sustained population of —$(NR_4^+)(OH^-)$ groups, as the cathode process is generating continuously $OH^-$ ions. Consequently, $CO_2$ entering the cathode will typically convert at high probability to carbonate according to process (5), before being significantly exposed to any ammonia entering the cell from its other (fuel) side.

Figure 4:
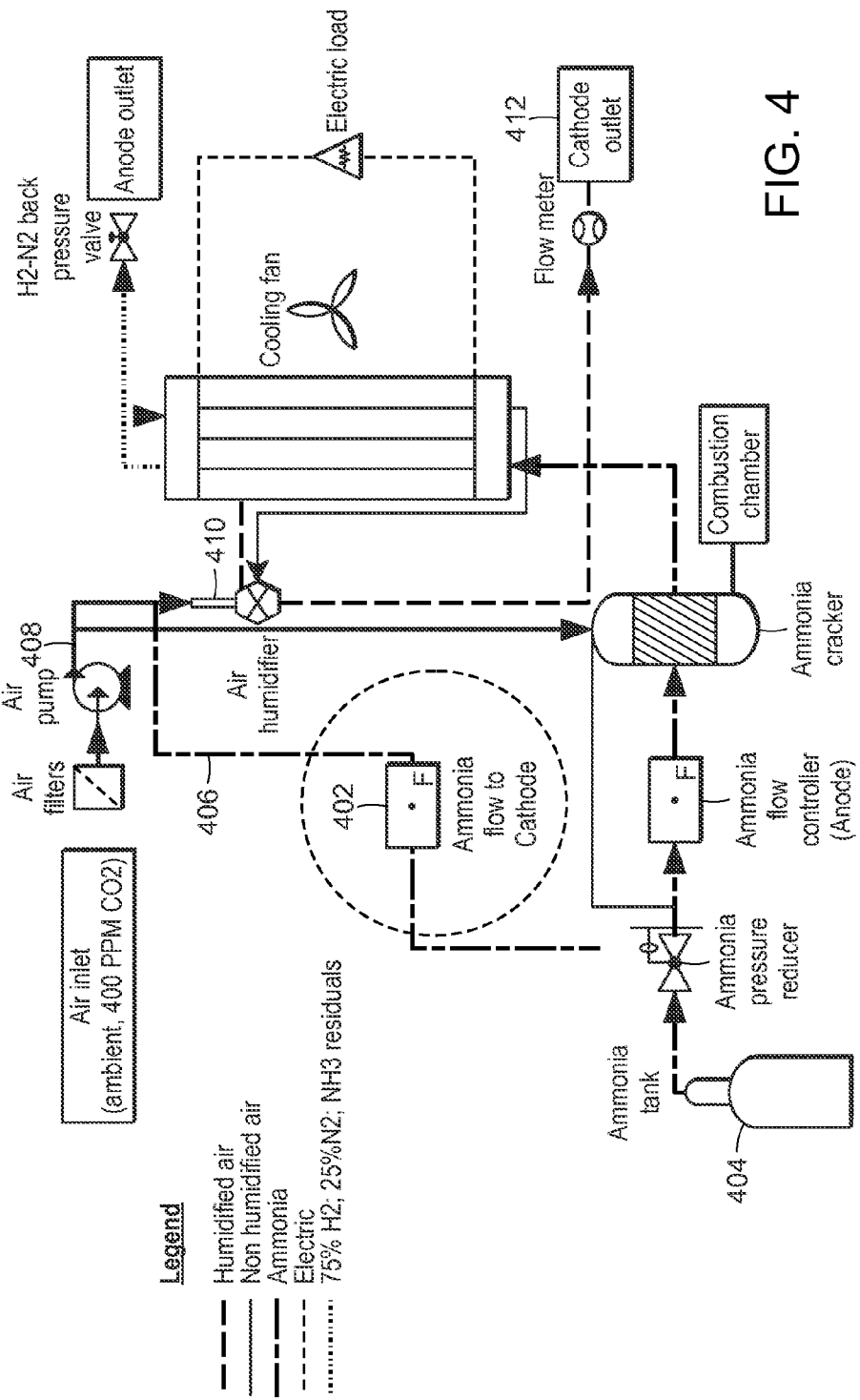
FIG. 4 shows a schematic diagram of an AMFC system with a direct bleed of ammonia into an air feed stream.

An exemplary innovative approach to the resolution of this difficulty is shown in FIG. 4. According to this scheme, some ammonia may be bled 402 from the ammonia tank 404 into the air feed stream 406 upstream the cathode inlet, so as to react with air-$CO_2$ according to Equations (3) and (4) before the air and any of the $CO_2$ in it reaches the cathode. The $CO_2$ can be fed upstream of a water exchanger used to humidify the incoming air stream and the $CO_2$ gettering process of Equation (3) and (4) can then take place while the air stream is passing through the water exchanger. To further increase the probability of $CO_2$ gettering by the ammonia bled into the air feed stream 408, a tube 410 filled with inert high surface area substrate can be placed between the water exchanger and the cathode inlet to preferably increase the probability of the encounter between an ammonia/water mix and the air-$CO_2$.

Other similar means for sustaining high efficiency of the gettering process of Equations (3) and (4) by providing proper inert substrate surface area and securing supply of sufficient water for processes Equations (3) and (4) are possible. In summary, bleeding of ammonia into the air feed stream either upstream a water exchanger or a tube section upstream the cathode inlet containing an inert, high surface area substrate, will preferably ensure a high probability of gettering air-$CO_2$ by ammonia and, thereby prevent carbonation of the AMFC ionomer.

When bleeding ammonia into the air feed stream, as shown in FIG. 4, the cathode exhaust stream 412 could contain ammonia at a level of the order of, for example, 0.1% and, consequently, release of such stream to the ambient air is likely to be unacceptable in many locations. In a preferred system design, the cathode exhaust in the system described in FIG. 4, rather than being released to the ambient air is fed into the combustor component of the thermal cracker. Routing the stack air exhaust into the combustor preferably resolves this issue, as ammonia is fully combusted at the temperature of the combustor in the presence of the large excess of independent air feed (e.g,. FIG. 4).

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. An ammonia operated fuel cell system comprising:
   an alkaline membrane fuel cell (AMFC) having an anode, a cathode, a cathode inlet and an air feed stream upstream of the cathode inlet;
   an ammonia thermal cracker including a combustion chamber, the cracker being in gas communication with an ammonia source, and configured to provide a supply of $H_2$ directly to the AMFC anode;
   wherein the ammonia source is in direct gas communication with the air feed stream upstream of the AMFC cathode inlet; and
   wherein the air feed stream upstream of the cathode of the AMFC is configured to receive a bleed of ammonia from the ammonia source.

2. The ammonia operated fuel cell system of claim 1 wherein exhaust from the anode of the AMFC is fed into the combustion chamber of the cracker.

3. The ammonia operated fuel cell system of claim 1 wherein the cracker is configured to produce an output of substantially 75% Hydrogen and 25% Nitrogen.

4. The ammonia operated fuel cell system of claim 1 further comprising a flow channel configured to provide a substantially uniform concentration of $H_2$ to substantially all parts of an active area of the AMFC.

5. The ammonia operated fuel cell system of claim 4 wherein the flow channel includes a spiral in a first rotational sense between an inlet and a center and a spiral in a second rotational sense between the center and an outlet.

6. The ammonia operated fuel cell system of claim 1 wherein an ammonia supply to a cathode of the AMFC is configured to getter $CO_2$ from the air supply.

7. The ammonia operated fuel cell system of claim 1 wherein an exhaust from a cathode of the AMFC is fed into the combustion chamber of the ammonia cracker.

8. The ammonia operated fuel cell system of claim 1 wherein the cracker output also contains levels of ammonia residues from 1 ppm to 20,000 ppm.

9. The ammonia operated fuel cell system of claim 1 where the thermal cracker is heated substantially by combustion of ammonia.

\* \* \* \* \*